Figures 1, 2, 3:
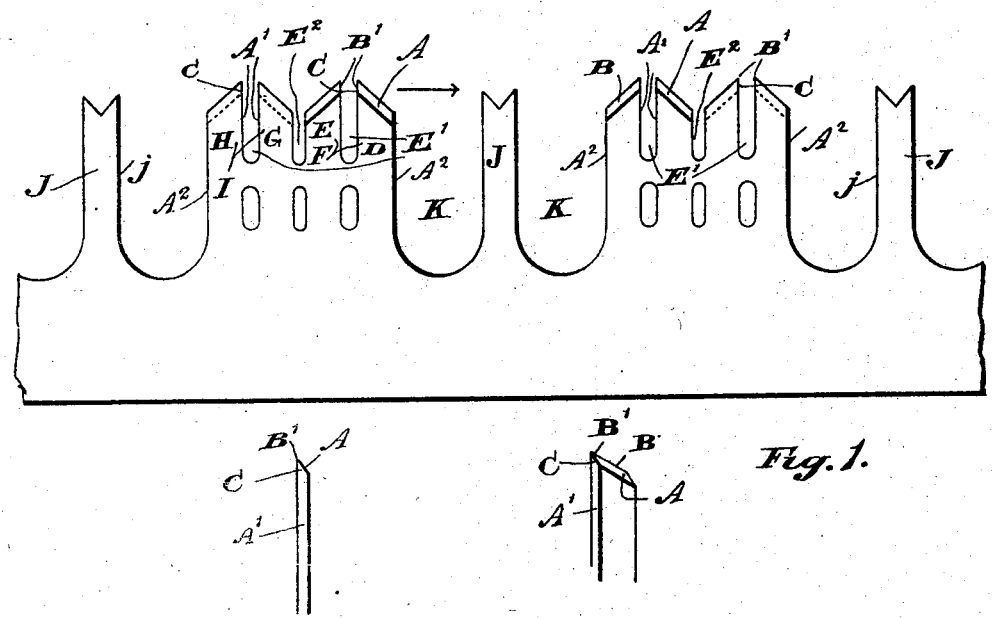

No. 739,361. PATENTED SEPT. 22, 1903.
S. TOLES.
SAW.
APPLICATION FILED APR. 10, 1903.
NO MODEL.

Witnesses.
G. G. Ronan
W. R. Blackhall.

Inventor.
S. Toles,
by Egerton R. Case,
Atty.

No. 739,361. Patented September 22, 1903.

UNITED STATES PATENT OFFICE.

SILAS TOLES, OF GALT, CANADA.

SAW.

SPECIFICATION forming part of Letters Patent No. 739,361, dated September 22, 1903.

Application filed April 10, 1903. Serial No. 151,983. (No model.)

*To all whom it may concern:*

Be it known that I, SILAS TOLES, sawmaker, of the town of Galt, in the county of Waterloo, in the Province of Ontario, Canada, have invented certain new and useful Improvements in Saws, of which the following is a specification.

My invention relates to improvements in saws; and the object of my invention is to design a saw constructed with a series of sets of teeth, each set being composed of two pairs of teeth, so as to prevent the accumulation of sawdust to any appreciable extent between the individual teeth of each pair and between the pairs of each set, thus storing the sawdust in large dust-spaces situated between the series of sets of teeth.

The construction of my saw will be hereinafter fully described.

Figure 1 is a side elevation of a portion of a crosscut-saw constructed according to my invention. Figs. 2 and 3 are views of a sawtooth constructed according to my invention.

In the drawings like letters of reference indicate corresponding parts in each figure.

It will of course be understood that the teeth may be made of any thickness, width, and depth and that they may be constructed with the usual perforations, if desired. It will of course be understood by one familiar with this art that the saw-teeth must be set in the usual manner. The teeth are all provided with a single side bevel A, as shown, thus forming the side cutting edge B, which may be constructed at any suitable angle required for practical use. Thus beveling the tooth essentially forms the apex or cutting-point B' at one side of the tooth. As the sides A' of the teeth are not beveled and are preferably formed at right angles to the tooth itself, I provide the blunt configuration or shape, as shown at C. The teeth must be used in sets of two pairs, and the beveled surfaces of each pair of the sets are on opposite sides of the saw-blade. D is one tooth, and E the other, of the pair F. These teeth are beveled on the same side of the saw and are separated from each other by a small space E' of sufficient width and depth, but not large enough to provide a dust-space of any utility. The cutting-points B' of each pair of teeth are placed opposite each other. From this it will be understood that the cutting-points of the pair F operate in the opposite side of the kerf to that of the cutting-points of the pair I. If the saw were moved in the direction indicated by arrow, the cutting edge of the tooth D would cut into the wood, and the blunt portion C of the side A' of the tooth E would come in contact with the rib formed by the cut and loosen same. As the teeth G and H of the second pair I follow the first pair the cutting edge of the tooth G cuts the opposite side of the kerf, and the blunt portion C of the side A' of the tooth H comes in contact with the rib formed by both pairs of teeth and leaves same loose in the kerf. As the spaces between the cutting-teeth of my saw are not large enough to provide dust-spaces of any utility, it will be understood that the said cutting-teeth do not carry the dust out of the kerf, and in order to remove this dust I provide a raker or drag tooth J, of any suitable construction, situated between two sets of teeth constructed as described and separated therefrom by the dust-spaces K, which are made quite large, so as to afford sufficient storage-room for the dust.

As is quite usual in saw manufacture, the raker or drag teeth J are made shorter than the cutting-teeth. It will be noticed that the sides *j* of the raker or drag teeth are not at all beveled, but are preferably constructed at right angles to the body of the tooth.

Although I have shown the pairs of teeth on each side of the raker or drag teeth J as being beveled on the same side of the saw, this is immaterial.

The spaces E' between the teeth of each pair need not necessarily be made of the depth indicated in the drawings, as the teeth have only to be provided with the sides A' for a sufficient distance to form the blunt portion C. Although I have shown spaces $E^2$ between the different pairs of teeth, it must be understood that I may construct my saw without same. I only construct my saw with the said space, as it enables me to file the teeth more conveniently. The sides $A^2$ of the teeth may be constructed at any convenient angle.

What I claim as my invention is—

A saw comprising a first set of teeth composed of a first pair beveled, at any suitable angle, on the same side of the saw, and having their apexes directly opposed to each other, and being separated by a space E' forming the sides A' of the teeth to provide blunt portions C; a second pair of teeth similarly beveled to the said first pair of teeth, but on the other side of the saw, the apexes of the said second pair also being directly opposed to each other, the teeth of said second pair being separated by a space E' forming the sides A' of the teeth to provide blunt portions C; a second set of teeth, comprising first and second pairs constructed similarly to the first and second pairs before described, and a raker or drag tooth situated between said sets of teeth and separated therefrom by the large dust-spaces K; the said spaces E' being much smaller than the said dust-spaces, substantially as set forth and described.

In testimony whereof I have signed my name to this specification in the presence of two subscribing witnesses.

SILAS TOLES.

Witnesses:
 EGERTON R. CASE,
 W. H. SMITH.